Sept. 12, 1961 W. E. CHOPE ET AL 2,999,381
NUCLEAR MAGNETIC RESONANCE MEASURING SYSTEM
Filed April 23, 1958 2 Sheets-Sheet 1

INVENTORS
WILBERT E. CHOPE
FRANK M. ALEXANDER
By Anthony D. Cennamo

Sept. 12, 1961  W. E. CHOPE ET AL  2,999,381
NUCLEAR MAGNETIC RESONANCE MEASURING SYSTEM
Filed April 23, 1958  2 Sheets-Sheet 2

INVENTORS
WILBERT E. CHOPE
FRANK M. ALEXANDER

2,999,381
NUCLEAR MAGNETIC RESONANCE MEASURING SYSTEM
Wilbert E. Chope and Frank M. Alexander, Columbus, Ohio, assignors to Industrial Nucleonics Corporation, a corporation of Ohio
Filed Apr. 23, 1958, Ser. No. 730,308
7 Claims. (Cl. 73—73)

This invention relates to nuclear magnetic resonance apparatus, and in particular to improvements for such apparatus which will provide a direct comparison of a first characteristic of a material under test to the weight of the material.

It is well known in the prior art relating to nuclear physics that many atomic nuclei possess magnetic moment and nuclear momentum or "spin." A nucleus having these characteristics displays gyroscopic effects and is therefore often considered analogous to a spinning gyroscope having a magnet positioned along its axis.

When such nuclei are subjected to a constant uniform external magnetic field, the spinning nuclei tend to precess around an axis parallel to the magnetic field with a characteristic frequency and with random phase. Initially the resulting polarization is zero, but, after a characteristic time, damping forces cause an excess of nuclei to exhibit a magnetic component in the direction of the external field. In the event the polarized nuclei are subjected to a radiofrequency magnetic field at right angles to the external field and at the frequency of nuclear precession, phase coherence is introduced among the nuclei with the result that the induced polarization precesses about the external field direction with a corresponding loss of energy in the radiofrequency field.

Prior investigators have studied the gyroscopic properties of nuclei by subjecting an element to a magnetic field produced by a permanent magnet or electromagnet and simultaneously irradiating the element with radiofrequency electromagnetic energy emanating from a tank coil. When the frequency of the radiofrequency source resonates with the frequency of nuclear precession, the spinning nuclei absorb a maximum amount of energy from the radiofrequency field thereby loading the tank circuit. It has been determined that the resonant frequency of nuclear precession varies for different elements and for different values of the polarizing magnetic field.

Within recent years, measuring devices have been proposed operative in response to the energy absorption occurring at the nuclear magnetic resonance frequency. From this absorption measurement, the relative proportion of an element in question can be determined because the total energy absorbed is a function of the number of nuclei present other things being equal. Apparatus of this type can be used for the quantitative determination of any element the nucleus of which possesses angular momentum and magnetic moment, such as for example, $H^1$, $He^3$, $Li^6$, $Be^9$ $B^{10}$, and $N^{14}$. Additionally, quantitative determination of numerous isotopes of elements can also be made, because in all cases the different isotopes possessing non-zero magnetic moments have different resonant frequencies in the same external field.

The absorption phenomenon of nuclear magnetic resonance is also used to measure constituent proportions in various compounds. For example, moisture content measurements can be made in materials, such as tobacco, paper and yarn. In such a determination the water content is not measured directly but, rather, the hydrogen in the material is distinguished from the hydrogen in water on the basis of widely differing absorption patterns. By applying the same principles it is possible to measure the presence of any compound which contains at least one element the nucleus of which possesses angular momentum and magnetic moment.

In one type of conventional nuclear magnetic resonance apparatus, radiofrequency current from a constant-current source is supplied to a parallel tuned circuit consisting of a coil and capacitor. The tank coil, ordinarily a solenoid or Helmholtz pair, is placed within the uniform external field of a permanent magnet so that the radiofrequency field is perpendicular to the external field, and the material to be measured is placed within the coil.

The frequency of the radiofrequency field, or the magnitude of the external field, is modulated at a slow audio rate. When the radiofrequency and the magnetic fields satisfy the relation $W_1 = \gamma H_0$, where "$W_1$" is the angular velocity of the radiofrequency field, "$H_0$" is the permanent magnetic field strength in gauss, and "$\gamma$" is a constant dependent on the type of nucleus subjected to resonance, nuclear magnetic resonance occurs. In moisture measurements, the hydrogen nucleus is caused to resonate, and "$\gamma$" equals $2.67 \times 10^4$ sec.$^{-1}$ gauss$^{-1}$.

The resulting nuclear resonance causes a decrease in the impedance of the tank circuit, and therefore a decrease in the voltage appearing across the tank circuit. For a given set of conditions the magnitude of this change in voltage is proportional to the amount of absorbing substance present so that a quantitative measurement can be made.

In certain applications it is advantageous to relate the characteristic of the material measured by the resonance phenomenon to the total weight of the material so that direct readout can be obtained responsive to both factors. In the fabrication of cigarettes, for example, it is desirable to obtain a direct percentage readout of moisture in a sample of shredded tobacco relative to the weight of the sample.

Accordingly, a principal object of this invention is to provide apparatus employing nuclear magnetic resonance techniques for measuring the ratio of a first characteristic of a material to the weight of that material.

Another object is to provide an improved readout in nuclear magnetic resonance apparatus for rendering direct percentage measurements of moisture relative to the weight of a sample.

Another object is to provide an improved device for measuring the moisture content of tobacco in a rapid and accurate manner.

A preferred embodiment of this invention adapted for making moisture determinations in tobacco combines a nuclear magnetic resonance moisture gauge, a simple weighing scale, and a unique readout device to measure directly the percent by weight of moisture in shredded tobacco samples. The readout device includes an array of lamps disposed in columns and rows. Percent moisture figures are associated with the lamps so that the illumination of one of the lamps renders a visual indication of the moisture content of the sample under test.

In a first procedure, the sample is first placed on the scale so that the readout device may be selectively prepared in accordance with the weight of the sample. Thereafter the sample is removed from the scale and is inserted within a magnet and coil assembly of the measuring gauge. The gauge selectively completes certain circuitry within the readout device, and a particular lamp is illuminated indicative of the percentage moisture content relative the weight of the sample.

A second procedure is also provided by a novel circuit feature associated with the scale. This feature enables a second sample to be weighted during the time interval the first sample is undergoing testing within the magnet and coil assembly of the moisture gauge. This mode of testing effects some reduction in overall test time per sample in view of the fact that the weight information of the next sample to be tested can be supplied to the readout device during the relatively lengthy time required to overcome the nuclear relaxation time of the moisture constituent of the tobacco.

In an alternative embodiment, the magnet and coil assembly of the moisture gauge is associated with the scale platform. This disposition provides for weight and moisture determinations in one positioning step rather than requiring an operator to move the sample from the scale to the moisture gauge.

In order that all of the features for attaining the objects of this invention may be readily understood, reference is herein made to the drawings wherein.

Figure 1:
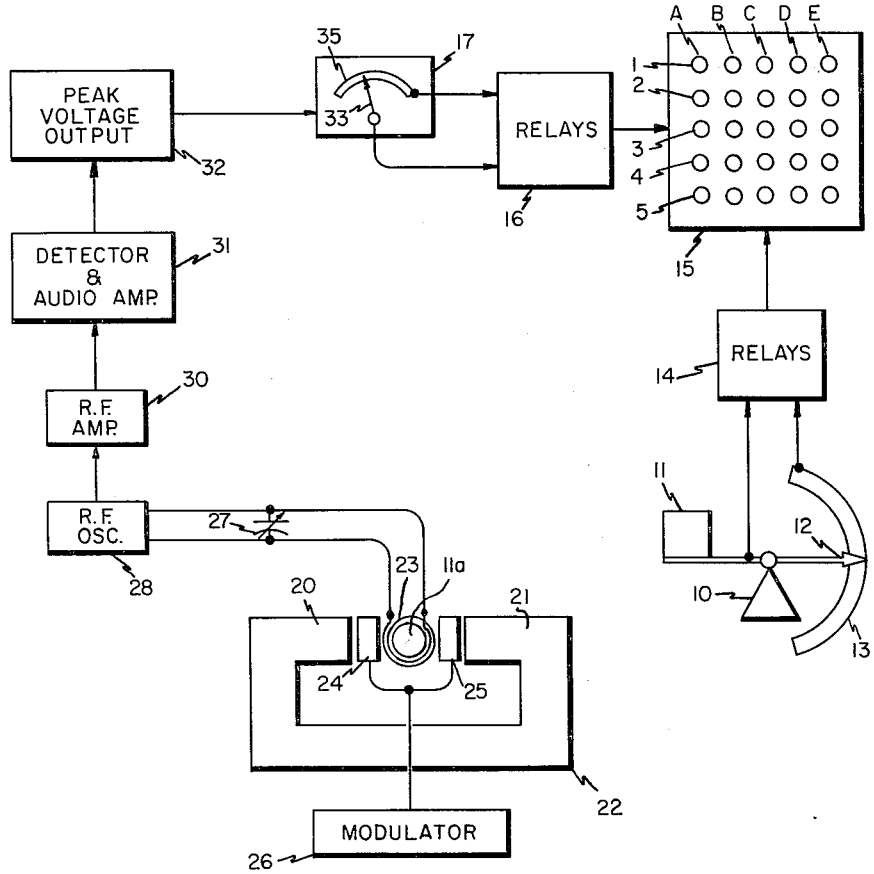
FIG. 1 is a simplified diagram of a first preferred embodiment of the apparatus of this invention in which the sample under test is first weighed and thereafter analyzed by a nuclear magnetic resonance moisture gauge.

Referring now to FIG. 1, scale 10 receives a sample 11 so that the weight of this sample may be registered by the position of pointer 12 relative to contact bar 13. As is hereinafter set forth in detail, contact bar 13 is segmented into a plurality of electrical contacts so that the selective making of a different contact by pointer 12 produces a unique energization of relay circuit 14.

Relay circuit 14 is operative to establish required circuit connections in readout panel 15. The readout panel presents an array of 25 lamps which are disposed in vertical columns A through E and horizontal rows 1 through 5. Selective illumination of the lamps in the readout panel provides a visual indication of the percentage of the sample quantity under test for the particular weight of the sample. For example, in the event that sample 11 comprises a mass of moist shredded tobacco, readout panel 15 provides a visual indication of the percent by weight of the moisture in the tobacco. Appropriate moisture percentage values are assigned to each of the lamps.

In the preferred embodiment shown in FIG. 1, sample 11 is first placed on scale 10 so as to selectively actuate relay circuit 14 in correspondence with the weight of the sample. This selective actuation of the relay circuit in turn prepares certain lamp energizing circuits in the readout panel 15 until such time as additional circuits in the readout panel may be energized by operation of relay circuit 16.

Meter 17 is responsive to the particular quantity in sample 11 which is to be measured by the nuclear magnetic resonance phenomena. For example, in the case of shredded tobacco, the moisture content of the sample is measured by the nuclear magnetic resonance apparatus hereinafter described. The relay circuit 14 first establishes required circuit connections in readout panel 15 in response to the weighing of sample 11 on scale 10, and thereafter the sample 11 must be removed from its position on scale 10 and placed in the nuclear magnetic resonance measuring position between the pole pieces 20 and 21 of magnet 22. The reference character 11a is hereinafter associated with sample 11 when the sample is disposed in the measuring position between pole pieces 20 and 21. It should be understood, however, that both reference characters 11 and 11a refer to the same sample.

Sample 11a is disposed within the bore of radio-frequency sampling coil 23, and is thus subjected to an intense radiofrequency field which is perpendicular to the magnetic field developed in the gap of pole pieces 20 and 21. Modulation coils 24 and 25 envelop pole pieces 20 and 21, respectively, so that the otherwise steady magnetic field is amplitude modulated by the audiofrequency energy supplied for modulation source 26.

Capacitor 27 shunts coil 23 so that the combination 23—27 forms a parallel resonant tank circuit connected to the output of constant-current radiofrequency oscillator 28. The tank circuit is tuned to the oscillator frequency, and therefore a substantial radiofrequency voltage appears across the combination 23—27. This voltage has a constant amplitude except during those periodic instances at which the output frequency of oscillator 28 and the modulated magnetic field generated by pole pieces 20 and 21 and modulation coils 24 and 25 satisfy the requirements for nuclear resonance.

During resonance, sample 11a absorbs energy from the radiofrequency field so as to periodically load coil 23. As is well known, the loading of a parallel tank circuit lowers the "Q" of the tank, thereby reducing the parallel impedance appearing across the tank. The periodic absorption of energy by material 11a amplitude modulates the radiofrequency voltage appearing across tank circuit 23—27. The amplitude of this component varies in accordance with the number of nuclei present to absorb energy from tank coil 23. In the case of moisture measurements on sample 11a, the hydrogen nucleus is caused to resonate and to absorb energy.

The voltage appearing across tank circuit 23—27 is applied to the input of radio-frequency amplifier 30. The signal output of radiofrequency amplifier 30 is in turn applied to the input of detector and audio-frequency amplifier 31 which has an output connected to peak voltage output device 32.

Output device 32 actuates a meter 17 so that pointer 33 of meter 17 is responsive to the peak amplitude of the periodic pulses developed in response to the nuclear magnetic resonance phenomena. The copending application of Kenneth E. Francis et al., Serial No. 718,894, filed March 3, 1958, discloses a preferred structural arrangement for output device 32 and meter 17. In general, output device 32 includes a recycling detector having a cathode-follower amplifier that develops a periodic sequence of pulses responsive to the peak amplitude of the pulses generated by the nuclear magnetic resonance phenomenon. These pulses have a constant width, and in view of the fact that the cathode-follower has a low output impedance, a peak-voltage, direct-current meter may be actuated so as to give direct readings of analytic measurements of moisture and like quantities.

As is hereinafter set forth in detail, the pointer 33 of meter 17 selectively contacts pointer contact bar 35 which is divided into a plurality of insulated sections. The relative position of the pointer with respect to this bar thus provides selective energization of relay circuit 16 in accordance with the moisture content measurements made on sample 11a. The operation of relay circuit 16 in turn selectively actuates contacts incorporated within readout panel 15 to energize an appropriate indicator lamp.

Figure 2:
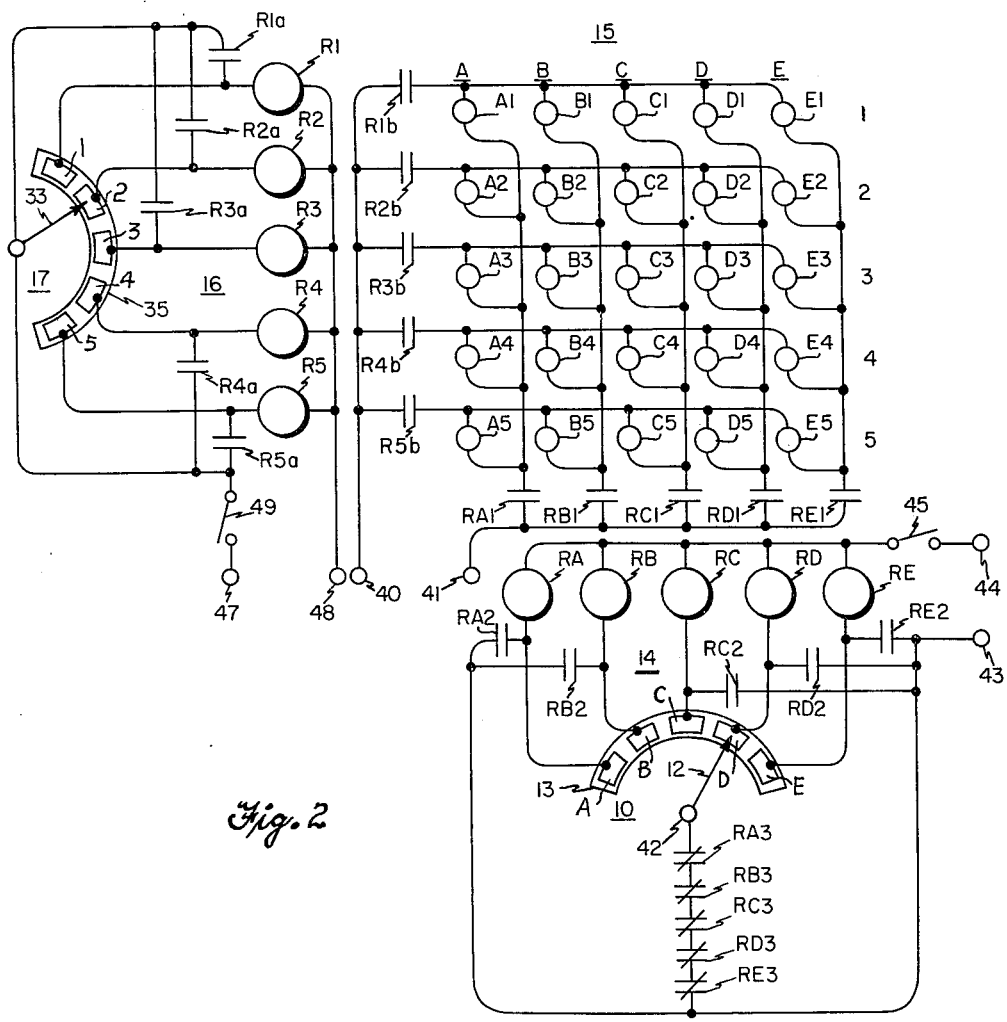
FIG. 2 is a detailed schematic diagram of the relay circuits and the readout panel employed in the arrangement of FIG. 1.

FIG. 2 discloses detail circuit arrangements for relay circuits 14 and 16 and also for the array of lamps incorporated in relay panel 15.

The array of lamps incorporated in readout panel 15 are disposed in five vertical columns A through E and five horizontal rows 1 through 5. It should be noted that each lamp is included in a unique column and row combination, for example, lamp C3 is connected in column C and also in row 3. The corresponding lower terminals of all of the lamps in each column are multiple connected to one another, and the upper terminals of all of the lamps in each row are also multiple connected to one another. A power supply for energizing the array of lamps is connected to terminals 40 and 41. During standby operation of the apparatus, none of the lamps are energized inasmuch as normally open row contacts R1b through R5b and normally open column contacts RA1 through RE1 prevent the energization of the lamps in the array. In the event that normally open row contact R3b and normally open column contact RC1, for example, are closed by appropriate operation of relays contained within relay circuits 14 and 16, an energizing circuit is established for lamp C3 and therefore this lamp is illuminated. It should be noted that a row contact and a column contact must be closed in order to energize a single lamp in the array.

Column contacts RA1 through RE1 are selectively closed by appropriate operation of relays RA to RE incorporated within relay circuit 14. Relay RA, for example, actuates column contact RA1 and also the make-before-break contact combination RA2—RA3. The remaining relays RB through RE actuate corresponding contact combinations.

Scale 10 includes a pointer 12 that rotates about the scale pivot point 42 so as to selectively contact segments A through E included within contact bar 13. Each segment is insulated from the other segments and therefore pointer 12 is capable of setting up five different electrical circuits. In the position shown in the drawing, pointer 12 contacts segment D so that relay RD may be energized. Pointer contact with the other segments produces selective energization of corresponding column relays RA, RB, RC or RE, as the case may be.

Each of the column relays RA through RE establishes its own locking circuit through the normally open locking contacts RA2 through RE2. After one of the locking contacts is made, the associated normally closed contact is opened thereby removing scale 10 from circuit operation until the break contact is again closed.

A power supply for energizing column relays RA through RE is connected to terminals 43 and 44. The momentary closure of weight switch 45 establishes an energizing circuit for one of the column relays RA through RE by a circuit connection which includes normally closed contacts RA3, RB3, RC3, RD3 and RE3, scale 10 (pointer 12 and contact segment D for the scale position shown in the drawing), and one of the column relays (column relay RD for the scale position shown in the drawing), back to the power supply connected to terminals 43 and 44.

After the actuation of column relay RD, for example, normally open locking contact RD2 is closed, thereby providing a locking circuit for relay RD so long as weight switch 45 is closed. Shortly after the closure of locking contact RD2, the associated contact RD3 is opened thereby isolating scale 10 from effective circuit operation. As will be hereinafter set forth in detail, the inclusion of contacts RA3, RB3, RC3, RD3 and RE3 in the circuit enables a particular sample 11 to be removed from scale 10 after weighing and a second sample placed thereon without disturbing the circuit connections previously established within readout panel 15.

Relays R1 to R5 incorporated within relay circuit 16 actuate row contacts R1b through R5b. The windings of row relays R1 through R5 are energized by a power source connected to terminals 47 and 48. The relay energizing circuit includes nuclear magnetic resonance switch 49 and meter 17. Pointer 33 of the meter selectively contacts segments 1 through 5 incorporated in contact bar 35. In the position shown in FIG. 2, pointer 33 contacts segment 2 and therefore relay R2 is energized in response to the closure of switch 49. Normally open contacts R1a through R5a are included in locking circuits for relays R1 through R5. Accordingly, energizing currents for the relays flow through pointer 33 and contact bar 35 only sufficiently long to energize one of the row relays and thereafter the circuit is maintained by one of the locking contacts.

In the event that the array of lamps incorporated within readout panel 15 is to provide percentage moisture readings by weight, the nuclear magnetic resonance apparatus that actuates meter 17 must respond to the hydrogen nucleus. Segments 1 through 5 of contact bar 35 should be so disposed and selected that the meter pointer 33 will normally register selective readings in response to the moisture content of various samples 11a under measurement. Likewise, the segments A through E incorporated within the contact bar 13 of scale 10 should be so selected that the scale will selectively establish varying circuit conditions in response to the sample weights likely to be obtained.

In the usual instance, scale 10 and meter 17 should be so constructed that overlapping percentage readings will be registered by the adjacent column of lamps. For example, the lamps A1 through A5 of column A may register the following percentage moisture readings: 8%, 8.5%, 9%, 9.5% and 10%. The lamps B1 through B5 of column B may appropriately register the following moisture percentage readings: 7.9%, 8.4%, 8.9%, 9.4% and 9.9%. It should be noted that the lamp of the uppermost rows indicate the lowest percentage moisture readings for the particular column involved, and that the lamps of the other rows progressively indicate increased moisture percentage readings.

The detailed operation of the foregoing apparatus in measuring the percentage moisture content by weight of shredded tobacco, for example, is as follows:

Initially a sample bottle or like container is filled with the shredded tobacco to a fill line and tamped until no voids are visible. The filled sample bottle is placed on scale 10 and after the scale balances the weight switch 45 is manually depressed. In the event that pointer 12 rests on contact segment D, the power supply connected to terminals 43 and 44 will energize relay RD. Accordingly, normally open contact RD1 is closed, thereby connecting the lower terminals of all the lamps in the D column to power terminal 41. Normally open contact RD2 is closed in response to the actuation of relay RD thereby establishing a locking circuit for relay RD. Normally closed contact RD3 is opened a very short time interval after contact RD2 is closed, accordingly the scale 10 is removed from effective circuit connection.

With switch 45 closed, sample 11 is removed from scale 10 and is placed within measuring coil 23 as is shown in FIG. 1. Inasmuch as the relaxation time of the sample must be overcome before an accurate moisture measurement can be made, considerable time saving will be effected if a second sample is placed upon scale 10. This enables the scale to be balanced to a new weight position corresponding to the weight of the second sample during the time interval that the first sample is undergoing moisture measurement. Inasmuch as contact RD3 is open, the second sample is ineffective to disturb the circuit connections established within relay circuit 14 in response to the weighing of the first sample.

After the relaxation time of sample 11a has been overcome, meter 17 will assume an equilibrium position responsive to the moisture content of the sample. Thereafter, moisture measurement switch 49 is manually closed, and assuming that pointer 17 contacts segment 2, relay R2 is energized thereby closing row contact R2b. The closure of contact R2b connects the upper terminal of lamp D2 to power terminal 40. Accordingly, lamp D2 is energized to give a visual indication of the percent moisture by weight of the sample under test. After this reading has been noted, both switches 45 and 49 may be manually released.

The opening of switch 45 restores the contact load of relay RD to its normal non-operate position. Thereafter scale 10 is effective ot establish new energizing circuits for the column relays in response to the closure of weight switch 45. Inasmuch as the second sample has already been placed on the scale, no delay is involved in energizing the appropriate column relay. The second sample is thereafter removed from the scale 10 and inserted within coil 23 for measurement as hereinbefore set forth with respect to the first sample.

Figure 3:
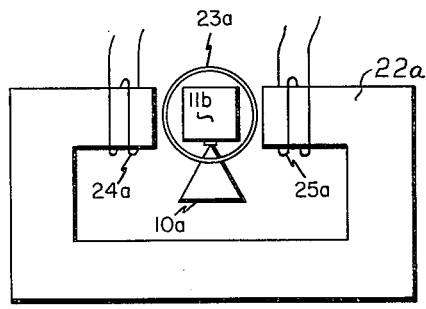
FIG. 3 is a modification of the embodiment shown in FIGS. 1 and 2 adapted to perform concurrent weight and analytic measurements on the sample under test.

FIG. 3 shows an alternative embodiment wherein the scale platform is integral with the magnet cavity sample holder. This eliminates the necessity for moving the sample under test from the scale to obtain nuclear magnetic resonance measurements. In particular magnet 22a, and coils 23a, 24a, and 25a are associated with the scale 10a in such a manner that the sample 11b may be subjected to the mutually perpendicular magnetic and radiofrequency fields required for nuclear resonance measurements at the same time that the weighing operation is conducted. The circuit arrangements associated with this alternative embodiment correspond exactly to those previously described and relating to FIGS. 1 and 2. In the alternative embodiment, after pointers 12 and 33 attain their appropriate positions, both switches 45 and 49 are simultaneously closed, thereby establishing the necessary circuit connections to energize the appropriate lamps within readout panel 15.

It should be understood that the above described arrangements are merely illustrative of the principles of this invention. Numerous other arrangements may be devised without departing from the scope of the invention.

What is claimed is:

1. Apparatus for rendering measurements responsive to the ratio of a particular characteristic of a sample to the weight of that sample, comprising a scale for weighing the sample, nuclear magnetic resonance measuring apparatus for measuring said particular sample characteristic, a readout panel including an array of lamps each indicative of a particular ratio reading, means selectively actuated by said scale for preparing different first groups of said lamps for indication in response to varying weight measurements of said sample, means selectively actuated by said nuclear magnetic resonance measuring apparatus for selectively preparing for indication different second groups of said lamps with each of said second groups including a lamp from each of said first groups, and means for energizing any lamp common to both a prepared first and second group to thereby render a ratio indication for the particular sample under test.

2. Apparatus for rendering measurements responsive to the ratio of a particular characteristic of a sample to the weight of that sample, comprising a scale for weighing the sample, nuclear magnetic resonance measuring apparatus for measuring said particular sample characteristic, a readout panel including an array of devices each indicative of a particular ratio reading, means selectively actuated by said scale for preparing different first groups of said devices for indication in response to varying weight measurements of said sample, means selectively actuated by said nuclear magnetic resonance measuring apparatus for selectively preparing for indication different second groups of said devices with each of said second groups including a device from each of said first groups, and means for energizing any devices common to both a prepared first and second group to thereby render a ratio indication for the particular sample under test.

3. Apparatus for rendering measurements responsive to the ratio of the moisture content of a sample to the weight of that sample, comprising a scale for weighing the sample, nuclear magnetic resonance measuring apparatus for measuring the moisture content, a readout panel including an array of devices each indicative of a particular ratio reading, means selectively actuated by said scale for preparing different first groups of said devices for indication in response to varying weight measurements of said sample, means selectively actuated by said nuclear magnetic resonance measuring apparatus for selectively preparing for indication different second groups of said devices with each of said second groups including a device from each of said first groups, and means for energizing any device common to both a prepared first and second group to thereby render a ratio indication for the particular sample under test.

4. Apparatus for rendering measurements responsive to the ratio of a particular characteristic of a sample to the weight of that sample, comprising a scale for weighing the sample, nuclear magnetic resonance measuring apparatus associated with said scale for measuring said particular sample characteristic during the weighing operation, a readout panel including an array of devices each indicative of a particular ratio reading, means selectively actuated by said scale for preparing different first groups of said devices for indication in response to varying weight measurements of said sample, means selectively actuated by said nuclear magnetic resonance measuring apparatus for selectively preparing for indication different second groups of said devices with each of said second groups including a device from each of said first groups, and means for energizing any device common to both a prepared first and second group to thereby render a ratio indication for the particular sample under test.

5. Apparatus for rendering measurements responsive to the ratio of a particular characteristic of a sample to the weight of that sample, comprising a scale for weighing the sample, nuclear magnetic resonance measuring apparatus for measuring said particular sample characteristic, a readout panel including an array of devices each indicative of a particular ratio reading, a first relay circuit selectively actuated by said scale for preparing different first groups of said devices for indication in response to varying weight measurements of said sample, a second relay circuit selectively actuated by said nuclear magnetic resonance measuring apparatus for selectively preparing for indication different second groups of said devices with each of said second groups including a device from each of said first groups, and a power source for energizing any device common to both a prepared first and second group to thereby render a ratio indication for the particular sample under test.

6. Apparatus for rendering measurements responsive to the ratio of the moisture content of a sample to the weight of that sample, comprising a scale for weighing the sample, nuclear magnetic resonance measuring apparatus for measuring the moisture content, a readout panel including an array of lamps each indicative of a particular ratio reading, a first relay circuit selectively actuated by said scale for preparing different first groups of said lamps for indication in response to varying weight measurements of said sample, a second relay circuit selectively actuated by said nuclear magnetic resonance measuring apparatus for selectively preparing for indication different second groups of said lamps with each of said second groups including a lamp from each of said first groups, a power source for energizing any lamp common to both a prepared first and second group to thereby render a ratio indication for the particular sample under test, and means effectively disenabling said scale from actuating said first relay circuit for controllable periods of time and during the weighing of a second sample thereon and while said first sample is undergoing moisture content measurement.

7. Apparatus for rendering measurements responsive to the ratio of a particular characteristic of a sample to the weight of the sample, comprising a scale for weighing the sample, nuclear magnetic resonance measuring apparatus for measuring said particular sample characteristic, means including an array of devices each to be operated in response to a particular ratio reading, means selectively actuated by said scale for preparing a different first group of said devices for operation in response to varying weight measurements of said sample, means actuated by said nuclear magnetic resonance measuring apparatus for selectively preparing for operation in response to varying measurements of said characteristic a different second group of said devices with each of said second groups including a device from each of said first groups, and means for operating any device common to both a prepared first group and a prepared second group to render thereby a ratio measurement for the sample under test.

References Cited in the file of this patent

UNITED STATES PATENTS

| | | |
|---|---|---|
| Re. 23,950 | Block et al. | Feb. 22, 1955 |
| 367,332 | Baxter | July 26, 1887 |
| 2,624,786 | Potter | Jan. 6, 1953 |
| 2,647,394 | Schaeperklaus | Aug. 4, 1953 |
| 2,769,968 | Schultheis | Nov. 6, 1956 |
| 2,799,823 | Shaw et al. | July 16, 1957 |
| 2,859,385 | Bentley | Nov. 4, 1958 |
| 2,859,403 | Kirchner | Nov. 4, 1958 |

OTHER REFERENCES

Publication "Tech-Talk," April 1957, Schlumberger Well Surveying Corp., Ridgefield, Connecticut.

Publication "NMR Moisture Analyzer Shows Big Potential," by Conway, Cohee and Smith, printed in "Food Engineering," June 1957.